United States Patent Office 3,474,043
Patented Oct. 21, 1969

3,474,043
**METHOD OF MANUFACTURING CERAMIC DI-
ELECTRICS AND RESISTANCES FROM THE
SAME COMPOSITION CERAMIC MATERIAL**
Viggo Køgs Andersen, Kokkedal, and Jørgen Kaas
  Pedersen, Niva, Denmark, assignors to Danfoss
  A/S, Nordborg, Denmark, a corporation of
  Denmark
Filed Dec. 7, 1964, Ser. No. 416,337
Claims priority, application Germany, Dec. 5, 1963,
  D 43,093
Int. Cl. H01b 1/06, 3/02
U.S. Cl. 252—520                        12 Claims

ABSTRACT OF THE DISCLOSURE

A dielectric or a semiconductor resistance is manufactured using ceramic material of the same composition for both elements. The ceramic material is composed mainly of a source of barium titanate and a minor amount of tantalum pentoxide. The ceramic material is sintered at a temperature between about 1150° and 1350° C. To obtain a semiconductor the temperature of sintering is at least 10° higher than the temperature of sintering to obtain a dielectric; also the time of sintering to obtain a semiconductor may be lengthened.

---

This invention relates generally to ceramic dielectrics and ceramic semiconductor resistors and more particularly to a new and improved method for making ceramic dielectrics and semiconductor resistors or resistances from a same ceramic material.

It is well known that a ceramic dielectric can be made by sintering a ceramic material, for example a material in which the main constituent is barium titanate. Dielectrics made from pure barium titanate normally have, within the normal range of operation thereof, very pronounced temperature-dependent characteristics such as dielectric and dielectric loss factor. Attempts have been made to achieve independence of temperature of these characteristics by the addition of various material to the barium titanate. For example, additional materials such as magnesium titanate, calcium titanate, iron and calcium oxides, alkaline earth fluorides and tantalum compositions or compounds have been used. These materials are generally sintered at elevated temperatures between 1000° and 1500° centigrade.

The manufacture of semiconductor resistors having a positive temperature coefficient by sintering a mixture of compound consisting largely of barium titanate and other admixture is known. For example, the use of such admixtures as yttrium oxide, bismuth oxide, antimony oxide, tungsten trioxide and oxides of rare earths and tantalum compounds is known. These materials are generally sintered at temperatures between 1000° and 1500° centigrade. Thus the technology and fields of study concerned with the manufacture of ceramic dielectrics and ceramic semiconductor resistances or resistors have had parallel development so to speak. However, up to the present invention it has always been the practice to attempt to select the mixtures of barium titanate and admixtures therewith in such a way that either a ceramic dielectric with the best possible constant or characteristic with respect to temperature or a semiconductor resistance with the desired resistance values relative to temperature are obtained from different compositions. Different compositions of ceramic material were heretofore employed when manufacturing capacitors than when manufacturing resistors.

A principal object of the present invention is to provide a new and improved and highly simplified method for producing both ceramic dielectrics with substantially temperature-independent characteristics and semiconductor resistors with a strongly positive temperature coefficient of resistance.

Another object is to provide a method which makes it possible to formulate a ceramic material and heat treat it in the same equipment whether ceramic resistors or capacitors are being manufactured.

A feature of the invention is the manufacture of ceramic dielectrics and semiconductor resistances with positive temperature coefficients from the same starting material. The final product, whether a dielectric or a semiconductor resistor, obtained from the same starting material in each case with required or desired characteristics, is a result only of the different temperature treatments during a sintering phase of the process to which the starting material is subjected.

The method or process according to the invention comprises the use of a ceramic material which is principally a source of barium titanate as a principal substance and the starting material may be either a material composed principally of barium titanate or a mixture of compounds or substances which when subjected to heat, produce mainly barium titanate when an admixture of about 0.05–0.03 and preferably about 0.01–0.02 mole percentage tantalum pentoxide is mixed therewith. These materials are sintered below or above a 10°–50° wide temperature range which lies inside or between an outer temperature range of about 1150° and 1350° centigrade.

Another feature of the method according to the invention is that the sintering time for the ceramic dielectric is longer than the sintering time for a resistance and is preferably a multiple of the sintering time for manufacturing a semiconductor resistance.

In each embodiment of the invention, the method steps preliminary to the sintering process are applicable to both end products, namely a resistor or a dielectric. For example, according to the invention, pre-sintering can be employed at temperatures of about 900° to 1100° centigrade and preferably at a temperature of about 1000° C.

Provision is made in the method in the invention to replace the part of the barium in barium titanate by other elements particularly strontium or lead so that certain special characteristics in the ceramic dielectric or semiconductor resistance can be obtained.

Thus according to the invention it is possible to manufacture either ceramic capacitors or semiconductor resistors, which are components or devices completely different electrically from one another by using the same basic materials and following the same manufacturing process with only a slight difference in the method of manufacture in the final phases or stages of the manufacturing process.

Other features and advantages of the method in accordance with the present invention will be better understood as described in the following specification and appended claims, in conjunction with the following drawings in which:

Figure 1:
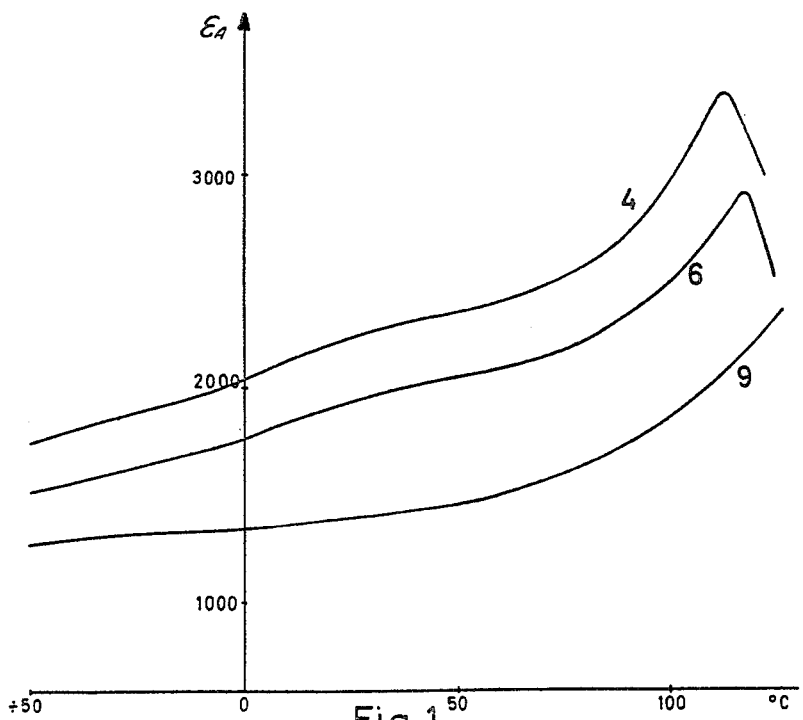
FIG. 1 is a graph of the dielectric constant versus temperature of some dielectrics, made with different compositions, to which the principles of the method according to the invention are applied.

The method hereinafter described as applied to the various materials hereinafter set forth is preferably according to the invention, carried out in known manner in an oxidizing or inert atmosphere in accordance with the materials used, for example in atmospheric air, oxygen or a nitrogen atmosphere.

Preferably, the basic or starting materials hereinafter described should be pure. However, the expression "principally" as applied to the source materials of barium titanate, or barium titanate itself, will be understood to indicate that the basic materials may include replacement compounds, for example lead oxide, strontium oxide, zinc oxide, zirconium oxide and similar compounds which may be present in a basic material. The terms "source" shall include the principal product or substance itself which the starting material principally yields and shall include the pure substance which can be subjected to a sintering step according to the process of the invention. The term "dielectric" as used hereinafter shall apply to insulator material usable for capacitors and elements for devices using such insulators, and shall include a capacitor. The term "resistance" is used generally to mean elements made of a material usable to determine resistance to a flow of current and shall include a resistor.

While different compositions of the mixture or starting material constituting the ceramic material will be hereinafter described, it will be understood that a relatively large number of possible compositions or combinations of compounds resulting from these starting materials and the treatment thereof according to the invention are set forth hereinafter in a table below.

In order to carry out the invention a mixture, in preparation for sintering, is prepared and comprises powdered barium carbonate, titanium dioxide and tantalum pentoxide. These are always present in the starting material. If desired, lead oxide or strontium carbonate are mixed in the mixture in respective, desired and known quantities to obtain the results that these compounds will yield in the finished product. hTe above materials are mixed in a ball mill. This mixture is then subjected to a pre-sintering step of application of heat for approximately two hours at a temperature of about 900° to 1100° C. and preferably in the order of 1000° C. The powdered product or material compounds are then formed in the desired form by known powder metallurgy techniques for example dry pressing, extruding, slip-casting and other means well known in the ceramic art.

The formed powdered material is then sintered. During the sintering phase of the process the final end product may be decided upon as to whether it will be a ceramic dielectric or semiconductor resistance. The sintering time and sintering temperature are in each case determined by the composition of the ceramic material to be treated.

The sintered material may be considered to have the empirical formula $(BAO)_x \cdot (TiO)_y \cdot (Ta_2O_5)_z$ wherein in $x, y, z$ are dependent on the proportion of barium carbonate, titanium dioxide and tantalum pentoxide in the starting mixture; these values are exemplified in the table below.

Different temperatures must be used on the same composition in obtaining a resistance than the temperatures employed for manufacturing a dielectric. This difference is a relatively small temperature difference and is in the order of about 10° C.–50° C. For example, in the table below in Example 4 a given composition is subjected to a sintering time of 60 minutes. The sintering temperature for a dielectric is in the order of 1280° C. while the sintering temperature for the manufacture of a semiconductor resistance from the same composition and for the same sintering time is in the order of 1320° C. Thus for a corresponding sintering time where the same ceramic material or composition is employed for manufacturing capacitors and resistors, the use of a temperature difference of about 40° C. will result in either a resistance or a dielectric.

Another example of the use of the same ceramic material and the same sintering time but different temperature levels for obtaining a dielectric or resistor is illustrated in Example 6 in the table where there is a difference of 45° between the temperatures of 1225° C. and 1180° C.

The method according to the invention can be practiced with the use of a same source or starting material or some composition of products of a preliminary step from which resistances and dielectrics can be made by using different sintering times and temperatures for manufacturing either of the end products. For example, the sintering time for manufacturing a ceramic dielectric can be considerably larger than the sintering time for manufacturing a semiconductor resistance as illustrated in Examples 4 and 4a in the table. Thus, for example, if a sintering time of only two minutes as against sixty minutes is employed in the making of a resistor this reduction or shortening of the sintering time results in the necessity of increasing the sintering temperature in which case the temperature difference between the making of a resistor and a capacitor is greater than the range of 10° C.–50° C. heretofore described when the same sintering time is employed in manufacturing ceramic dielectrics and semiconductor resistances.

Moreover, as seen in a table below, in which Examples 1–10 of possible compositions are illustrated, the sintering time for making ceramic dielectrics from a given material or composition may be longer than for making a resistance thereof and is preferably a multiple of the sintering time for making a resistance. In the table it can be seen that the admixtures in the various examples of ceramic materials and sintering temperatures and sintering times can be varied. For example, the tantalum pentoxide admixtures in Examples 1 to 5 inclusive is varied and in Examples 6 to 9 inclusive the influence of admixtures of lead to the ceramic composition is illustrated. In the last Example 10 the amount of tantalum pentoxide is changed compared to Example 9.

TABLE

| | | | | | Semi-conductor Resistance | | | CERAMIC DIELECTRIC | | | | |
|---|---|---|---|---|---|---|---|---|---|---|---|---|
| Composition of Sintered Material in Moles | | | | | Sintering | | | Sintering | | | | |
| | | | | | Temp. | Time | Specific Resistance, Ohm, cm. | Temp. | Time | Specific Resistance, Ohm $\times 10^{13}$ | Relative Dielectric Constant r, 25° | Power Factor, tan$\delta$ $\times 10^{-3}$ |
| Nr. | BaO | PbO | TiO$_2$ | Ta$_2$O$_5$ | ° C. | Min. | | ° C. | Min. | | | |
| 1 | 48.25 | 0 | 51.75 | 0.050 | 1,340 | 2 | 250 | 1,270 | 60 | 9 | 2,390 | 1.85 |
| 2 | 48.25 | 0 | 51.75 | 0.0675 | 1,340 | 2 | 160 | 1,270 | 60 | 12 | 2,440 | 2.05 |
| 3 | 48.25 | 0 | 51.75 | 0.075 | 1,340 | 2 | 45 | 1,265 | 60 | 8 | 2,580 | 2.10 |
| 4 | 48.25 | 0 | 51.75 | 0.0825 | 1,340 | 2 | 70 | 1,280 | 60 | 6 | 2,530 | 1.90 |
| 4a | | | | | 1,320 | 60 | 600 | | | | | |
| 5 | 48.25 | 0 | 51.75 | 0.090 | 1,340 | 2 | 50 | 1,265 | 60 | 7 | 2,330 | 2.10 |
| 6 | 49 | 0 | 51 | 0.0825 | 1,225 | 60 | 150 | 1,180 | 60 | 15 | 1,960 | 1.60 |
| 7 | 47 | 2 | 51 | 0.0825 | 1,340 | 2 | 50 | 1,265 | 60 | 4 | 1,940 | 2.65 |
| 8 | 45 | 4 | 51 | 0.0825 | 1,340 | 2 | 50 | 1,210 | 60 | 7 | 1,450 | 2.50 |
| 9 | 43 | 6 | 51 | 0.0825 | 1,340 | 2 | 100 | 1,265 | 60 | 9 | 1,390 | 2.85 |
| 10 | 43 | 6 | 51 | 0.0750 | 1,340 | 2 | 90 | 1,270 | 60 | 8 | 1,330 | 2.70 |

From the table above, it can be seen that by using the same ceramic material, either semiconductor resistances or dielectrics can be made from this same material by sintering in each instance for a same period of time but at different temperatures or by sintering for different periods of time and different temperatures when manufacturing resistors or dielectrics. The table illustrates in mole ratios the composition of the compounds of the material sintered, which may be products of a pre-sintering step, and shows, in moles, the barium oxide and titanium dioxide necessary for yielding the barium titanate and the minor amounts of tantalum pentoxide is given in moles per hundred moles of the other two compounds used in the various compositions sintered. Lead monoxide, given in moles, is illustrated as being present in four examples of ceramic material.

Figure 2:
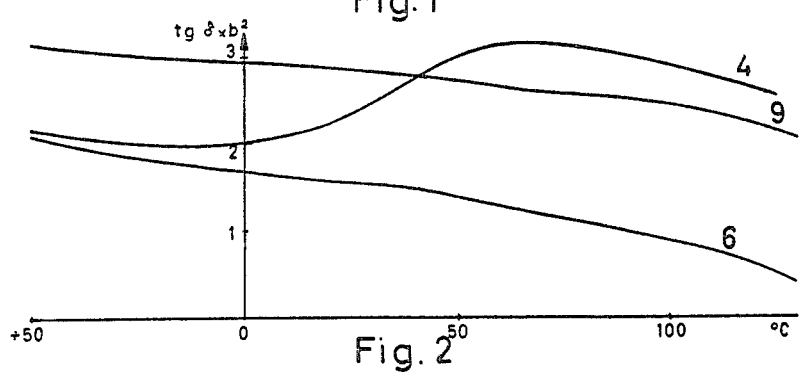
FIG. 2 is a graph of the tan δ versus temperature of some ceramic compositions treated according to the method of the invention.
Figure 3:
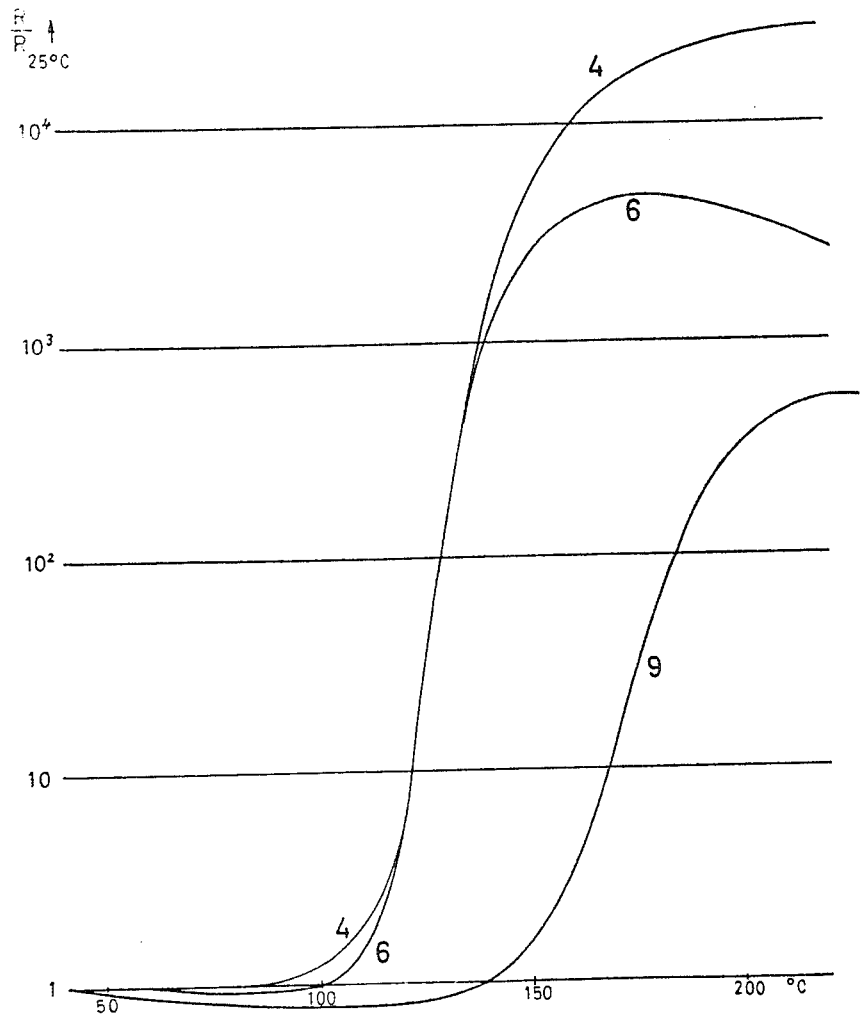
FIG. 3 is a graph of the relative resistance of some materials, treated according to the invention, and illustrates the strongly positive temperature coefficient of resistance of these materials.

Moreover, from the drawing it can be seen that the various different characteristics can be obtained by using different composition materials in which the solid lines have reference numerals thereto corresponding to a respective example of the table above. The various characteristics are thus a function of composition and the sintering phase or final phase of the treatment of the materials. The graph in FIG. 1 illustrates the dielectric constant $e_r$ for Examples 4, 6 and 9 of the composition in the above table platted against temperature. FIG. 2 illustrates the power factor (tan $\delta \times 10^{-2}$) curves for the same examples of compositions and FIG. 3 illustrates the relative resistance ($R/R_{25° C.}$) curves of these compositions. These curves illustrate the characteristics of the graphed examples as functions of temperature.

What we claim and desire to secure by Letters Patent is:

1. A method for manufacturing either a dielectric or a semiconductor resistance having a positive temperature coefficient using ceramic material of the same composition for both said dielectric and said semiconductor resistance comprising, providing a ceramic material consisting essentially of a source principally of barium titanate as a principal substance and tantalum pentoxide, in an amount of about 0.005 to 0.09 mole per 100 moles of barium titanate, sintering said material at a selected temperature in a temperature range between about 1150° C. and about 1350° C. for a selected period of time, said temperature being selected as a given temperature in said temperature range for sintering said dielectric and another higher temperature in said temperature range for sintering said semiconductor resistance, and said given temperature and another higher temperature differing by at least about 10° C.

2. A method for manufacturing either a dielectric or a semiconductor resistance having a positive temperature coefficient using ceramic material of the same composition for both said dielectric and said semiconductor resistance comprising, providing a mixture of powdered ceramic material consisting essentially of a source principally of barium titanate as a principal substance and tantalum pentoxide in an amount of about 0.05 to 0.09 mole per 100 moles of barium titanate, sintering said material at a selected temperature in a temperature range between about 1150° C. and about 1350° C. for a selected period of time, said temperature being selected as a given temperature in said temperature range for sintering said dielectric and as a temperature at least 40° higher in said temperature range than said given temperature for sintering said semiconductor resistance.

3. A method according to claim 2, including prior to sintering said ceramic material forming said material.

4. A method according to claim 2, including prior to sintering said ceramic material subjecting it to heat at a presintering temperature within a range of about 900° C. to 1100° C.

5. A method according to claim 2, in which said ceramic material comprises barium carbonate and titanium dioxide, and in which prior to sintering, said barium carbonate and titanium dioxide are subjected to heat for a period of one to four hours and at a temperature from about 900° C. to about 1100° C.

6. A method according to claim 2, in which said ceramic material comprises barium oxide, titanium dioxide and said tantalum pentoxide.

7. A method according to claim 6, in which said ceramic material comprises a given mole ratio of said barium monoxide and said titanium dioxide, and in which said barium monoxide comprises from about 43.0 moles to about 50.0 moles, said titanium dioxide comprises from about 51.0 moles to about 51.75 moles.

8. A method according to claim 2, in which said ceramic material is powered, and in which prior to sintering said powdered material is formed.

9. A method according to claim 2, in which said ceramic material is sintered for a longer period of time when sintering said material to manufacture said dielectric than when sintering said material to manufacture said resistance.

10. A method according to claim 9, in which said time said ceramic material is sintered for manufacturing said dielectric is a multiple of the time said ceramic material is sintered for manufacturing said resistance.

11. A method for manufacturing either a dielectric or a semiconductor resistance having a positive temperature coefficient using ceramic material of the same composition for both said dielectric and said semiconductor resistance comprising, providing a ceramic material having the empirical formula $$(BaO)_{48.25-49.0} \cdot (TiO_2)_{51.0-51.75} \cdot (Ta_2O_5)_{0.05-0.09}$$

sintering said material at a selected temperature in a temperature range between about 1150° C. and about 1350° C. for a selected period of time, said temperature being selected as a given temperature in said temperature range for sintering said dielectric and another higher temperature in said temperature range for sintering said semiconductor resistance, the difference in said given temperature and higher temperature being about 40° to 75° C.

12. A ceramic material for manufacturing a dielectric or a semiconductor resistance having a positive temperature coefficient, said ceramic material consisting essentially of a source principally of barium titanate as a principal substance and tantalum pentoxide in an amount of about 0.05 to 0.09 mole per 100 moles of barium titanate, said material comprising ceramic material sintered at a selected temperature in a temperature range between about 1150° C. and about 1350° C. for a selected period of time, the sintering temperature being selected as a given temperature in said temperature range for said dielectric and another higher temperature in said temperature range for said semiconductor resistance, and said given temperature and another higher temperature differing by at least about 10° C.

References Cited

UNITED STATES PATENTS

| 3,268,783 | 8/1966 | Saburi | 106—39 X |
| 2,989,483 | 6/1961 | Miller | 106—46 X |
| 3,231,799 | 1/1966 | Prokopowicz et al. | 106—39 X |

FOREIGN PATENTS 755,860   8/1956   Great Britain.

OTHER REFERENCES

Sabori, O.: Properties of Semiconductor Barium Titanates, in Ceram. Abstracts, February 1960, p. 40.

Sauer, H. A., and Fisher, J. R.: Processing of Positive Temperature Coefficient Thermistors; in Jour. Amer. Cer. Soc., 43 (6), June 1960, pp. 297–301.

Heywang, W.: "Resistivity Anomaly in Doped Barium Titanate," in Jour. Amer. Cer. Soc., 47, 1964, p. 484.

HELEN M. McCARTHY, Primary Examiner

W. R. SATTERFIELD, Assistant Examiner

U.S. Cl. X.R.

106—39, 46; 252—63.5; 264—56